(12) United States Patent
Pillai et al.

(10) Patent No.: US 7,501,932 B2
(45) Date of Patent: Mar. 10, 2009

(54) SYSTEM AND METHOD OF READING FROM AND/OR WRITING TO AN RF TRANSPONDER

(75) Inventors: Vijay Pillai, Mukilteo, WA (US); Harley Heinrich, Snohomish, WA (US); Rene Martinez, Seattle, WA (US)

(73) Assignee: Intermec IP Corp., Woodland Hills, CA (US)

( * ) Notice: Subject to any disclaimer, the term of this patent is extended or adjusted under 35 U.S.C. 154(b) by 187 days.

(21) Appl. No.: 11/146,524

(22) Filed: Jun. 6, 2005

(65) Prior Publication Data

US 2006/0273883 A1 Dec. 7, 2006

(51) Int. Cl.
*H04Q 5/22* (2006.01)
(52) U.S. Cl. .................................... 340/10.1
(58) Field of Classification Search ............... 340/10.1, 340/10.2, 10.3, 10.42, 10.5, 10.51, 572.1, 340/5.2, 825.5; 455/574
See application file for complete search history.

(56) References Cited

U.S. PATENT DOCUMENTS

| | | | | |
|---|---|---|---|---|
| 5,712,630 | A * | 1/1998 | Nanboku et al. | 340/10.3 |
| 7,193,504 | B2 * | 3/2007 | Carrender et al. | 340/10.4 |
| 2002/0175805 | A9 * | 11/2002 | Armstrong et al. | 340/10.31 |
| 2003/0179078 | A1 | 9/2003 | Chen et al. | |
| 2004/0012486 | A1 * | 1/2004 | Mani | 340/10.2 |
| 2004/0025035 | A1 * | 2/2004 | Jean-Claude et al. | 713/189 |
| 2004/0036626 | A1 * | 2/2004 | Chan et al. | 340/870.17 |
| 2006/0063506 | A1 | 3/2006 | Miwa et al. | |

* cited by examiner

*Primary Examiner*—Brian A Zimmerman
*Assistant Examiner*—Nabil H Syed
(74) *Attorney, Agent, or Firm*—O'Melveny & Myers LLP

(57) ABSTRACT

At least one identification (ID) number is used to effectuate communication between a radio frequency (RF) number and a radio frequency identification (RFID) base station. In accordance with a first embodiment of the present invention, at least a first ID number and a second ID number are stored on an RF transponder. Upon receipt of a write request, the RF transponder compares an ID number portion of the write request with the second ID number stored on the RF transponder. If the numbers matched, then a data portion of the write request is stored on the RF transponder. If the ID numbers do not match, then the write request is ignored. In accordance with a second embodiment of the present invention, the RF transponder is adapted to determine the second ID number using at least a portion of the first ID number. For example, the second ID number could be a subset of the first ID number, determined using an algorithm that is based (at least in part) on a portion of the first ID number, etc. In accordance with a third embodiment of the present invention, the second ID number is independent of the first ID number. For example, the second ID number could be a constant that is unrelated to the first ID number. In accordance with a fourth embodiment of the present invention, the data portion of the write request is stored on the RF transponder before the ID number portion of the write request is compared to the ID number stored on the RF transponder. If the ID number portion of the write request matches the ID number stored on the RF transponder, then the stored data is left undisturbed. If, however, the ID numbers do not match, then the stored data is erased (e.g., replaced with a null set, the original data, etc.).

18 Claims, 4 Drawing Sheets

SYSTEM AND METHOD OF READING FROM AND/OR WRITING TO AN RF TRANSPONDER

BACKGROUND OF THE INVENTION

1. Field of the Invention

The present invention relates to radio frequency (RF) transponders and radio frequency identification (RFID) systems, and more particularly, to a system and method of using at least one identification number to effectuate communication between an RF transponder and an RFID base station.

2. Description of Related Art

In the automatic data identification industry, the use of RF transponders (also known as RF tags) has grown in prominence as a way to track data regarding an object on, which an RF transponder is affixed. An RF transponder generally includes a semiconductor memory in which information may be stored. An RF base station containing a transmitter-receiver unit is used to query an RF transponder that may be at a distance from the base station. The RF transponder detects the interrogating signal and transmits a response signal containing encoded data back to the base station. RF and RFID systems are used in applications such as inventory management, security access, personnel identification, factory automation, automotive toll debiting, and vehicle identification, to name just a few.

Such RFID systems provide certain advantages over conventional optical indicia recognition systems (e.g., bar code symbols). For example, the RF transponders may have a memory capacity of several kilobytes or more, which is substantially greater than the maximum amount of data that may be contained in a conventional one-dimensional bar code symbol. The RF transponder memory may be re-written with new or additional data, which would not be possible with a printed bar code symbol. Moreover, RF transponders may be readable at a distance without requiring a direct line-of-sight view by the interrogator, unlike bar code symbols that must be within a direct line-of-sight and which may be entirely unreadable if the symbol is obscured or damaged. An additional advantage of RFID systems is that several RF transponders can be read by the interrogator at one time.

RF transponders may either be "read-only" (R), in which data can only be read from the RF transponder, or "read/write" (R/W), in which data can both be read from and written to the RF transponder. In R/W RF transponders, the memory is typically divided into two sectors—a first sector that is "write protected" and a second sector that is not. Data that is stored in the second sector is allowed to be erased or overwritten. The first sector general includes information that should not to be erased, such as the RF transponder's identification (ID) number and the like.

The traditional method of writing data to a R/W RF transponder is to first interrogate the transponder to determine its ID number. The ID number is then used by the RFID base station to identify the transponder (e.g., to determine whether a write request can or should be transmitted, etc.) and to construct a proper write request. This is because a write request general includes (i) a write command (or opcode), (ii) an address of a memory device, (iii) data to be stored at that address, and (iv) the ID number of the RF transponder at issue. The RF transponder's ID number is an important component of the request in that it allows the RF transponder to determine which transponder the request is directed toward. In other words, if the ID number included in the write request does not match the ID number stored on the RF transponder, the request may be ignored by the transponder.

A drawback of such a communication method is that an ID number is typically large, and therefore increases the amount of time it takes to perform a write operation. This is because the (large) ID number needs to be retrieved from memory, transmitted to the RFID base station, incorporated into the write request, and transmitted back to the RF transponder. The ID number needs to be large, however, to provide sufficient discrimination between a large number of RF transponders (or objects attached thereto).

Accordingly, it would be very desirable to provide a system and method of communicating with an RF transponder that shortens the amount of time it takes to perform a write operation. It would also be very desirable to do so without decreasing (at least substantially) the number of RF transponders that can be identified.

SUMMARY OF THE INVENTION

In accordance with the teachings of the present invention, at least one identification (ID) number is used to effectuate communication between a radio frequency (RF) transponder and a radio frequency identification (RFID) base station. In a preferred embodiment of the present invention, the RFID base station includes a memory device and a processor connected to an RF transmitter and an RF receiver. When interrogating the RF transponder, signal data, as provided by the processor, is transmitted to the RF transponder via the transmitter. Back-scattered data is then received by the receiver and provided (directly or indirectly) to the processor.

In a preferred embodiment of the present invention, the RF transponder includes a memory device and a signal processing circuit connected to an RF front end. When interrogated by the RFID base station, RF signals are received by the RF front end and decoded by the signal processing circuit. If the received RF signal is recognized as a read request and the ID number included in the read request matches an ID number stored in the memory device, then data stored in the memory device is modulated onto the back-scattered RF field. If, however, the received RF signal is recognized as a write request and the ID number included in the write request matches an ID number stored in the memory device, then data included in the write request is stored in the memory device.

In accordance with a first embodiment of the present invention, at least a first ID number (e.g., a full ID number) and a second ID number (e.g., a compact ID number) are stored on the RF transponder, wherein the first ID number is a unique (or substantially unique) identifier of the RF transponder (or the object attached thereto) and the second ID number is (i) smaller than the first ID number and (ii) can be used to distinguish the RF transponder from at least one other RF transponder. In accordance with this embodiment, the RFID base station is adapted to communicate with the RF transponder by requesting its second ID number and using the second ID number to construct a write request. In other words, the second ID number is used as the ID number portion of the write request. Upon receipt of such a write request, the RF transponder is adapted to compare the ID number portion of the write request with the second ID number stored in the memory device. If the numbers match, the data portion of the write request is stored in the memory device. If the ID numbers do not match, the write request is ignored.

In accordance with a second embodiment of the present invention, the RF transponder is adapted to determine the second ID number using at least a portion of the first ID number. For example, the second ID number could be a subset of the first ID number, determined using an algorithm that is based on at least a portion of the first ID number (e.g., a random-number-generator algorithm using at least a portion of the first ID number as a "seed"), etc.

In accordance with a third embodiment of the present invention, the second ID number is independent of the first ID number. For example, the second ID number may be a constant that is provided to (or determined by) the RF transponder when it is being manufactured, attached to an object, or anytime thereafter.

In accordance with a fourth embodiment of the present invention, the data portion of the write request is stored in the memory device on the RF transponder before the ID number portion of the write request is compared to the ID number stored in the memory device. In other words, the RF transponder is adapted to store (or at least begin storing) the data portion of the write request before the entire ID number portion of the write request is received and/or compared with the ID number stored in the memory device. If the ID number portion of the write request matches the ID number stored in the memory device (e.g., the first ID number, the second ID number, etc.), then the stored data is left undisturbed. If, however, the ID numbers do not match, then the stored data is erased (e.g., replaced with a null set, the original data, etc.).

A more complete understanding of a system and method of using at least one identification number to effectuate communication between an RF transponder and an RFID base station will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method of using at least one identification number to effectuate communication between a radio frequency (RF) transponder and a radio frequency identification (RFID) base station. In the detailed description that follows, like element numerals are used to describe like elements illustrated in one or more figures.

Figure 1:
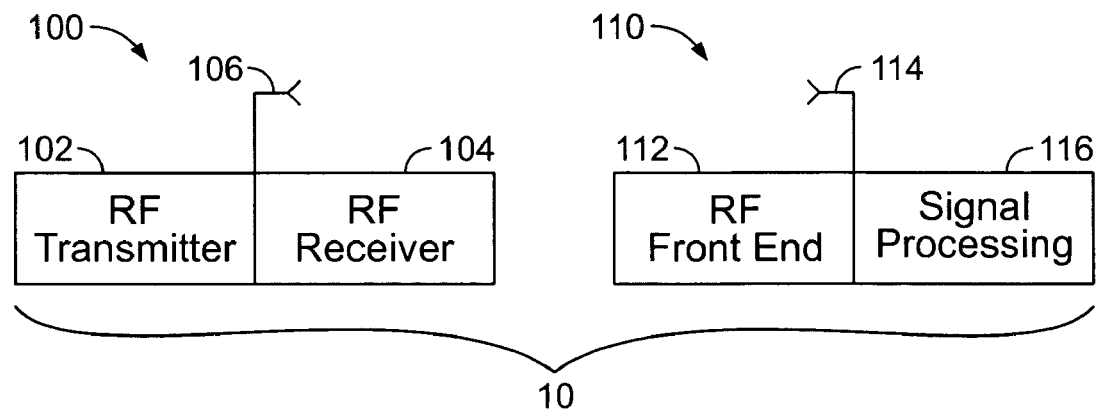
FIG. 1 is a conceptual block diagram of an RFID system including an RFID base station and an RF transponder.

An RFID system in accordance with the principles of the present invention is illustrated in the conceptual block diagram of FIG. 1. Specifically, the RFID system 10 includes an RFID base station 100 and an RF transponder 110, wherein the RFID base station 100 includes (in part) an RF transmitter 102, an RF receiver 104, and an antenna 106 connected therebetween, and the RF transponder 110 includes (in part) an RF front end 112, a signal processing circuit 116, and an antenna 114 connected to at least the RF front end 112. It should be appreciated that that the number and location of the components illustrated in FIG. 1 are not limitations of the present invention, but are merely provided to illustrate the environment in which the present invention may operate. Thus, for example, an RFID base station and/or RF transponder having additional components/circuits (e.g., processor, memory, clocking, amplifier, etc.) are considered to be within the spirit and scope of the present invention.

In communicating with the RF transponder 110, the base station 100 interrogates the transponder 110 by generating an RF signal over a particular carrier frequency. The RF signal is coupled to the antenna 106 and transmitted to the transponder 110. The RF signal emitted by the antenna 106 will, ostensibly, be received by the transponder antenna 114 if the transponder 110 is within the transmitting range of the base station 100. If the field strength of the RF signal satisfies a predetermined read threshold requirement and the RF signal includes a request to read information stored on the RF transponder 110 (i.e., a read request or a read data packet), the RF transponder 110 will respond by modulating the RF carrier to impart information about the transponder (e.g., identification (ID) number, etc.) onto the back-scattered RF field. The RF field is then propagated to the base station 100, where the imparted information can be recovered. If, however, the RF signal includes a request to write information to the RF transponder 110 (i.e., a write request or a write data packet), the RF transponder 110 is a read/write (R/W) transponder, and the ID number included in the write request matches the ID number stored on the RF transponder 110, then the data included in the write request (or a portion thereof) will be stored on the RF transponder 110.

Figure 2:
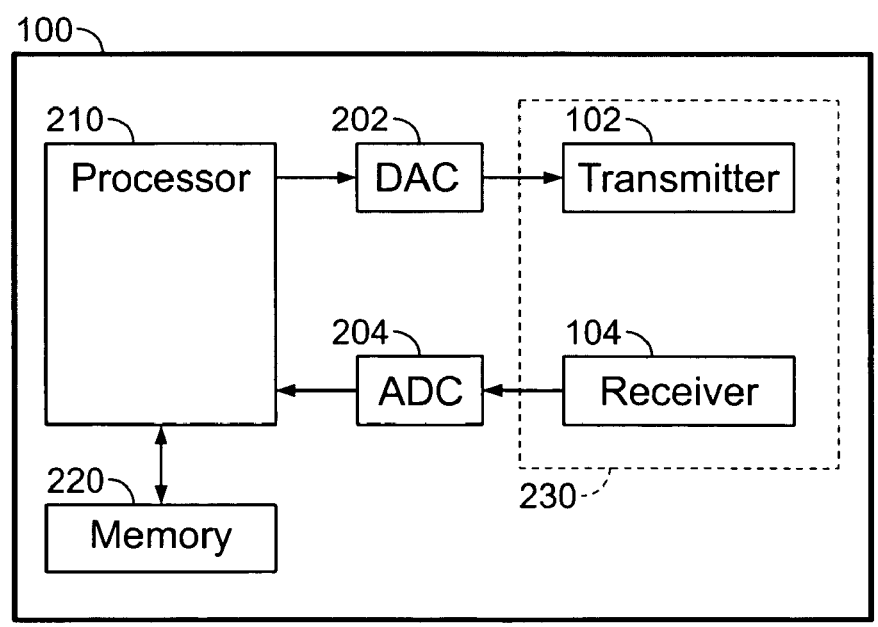
FIG. 2 illustrates an RFID base station that operates in accordance with one embodiment of the present invention.

A more detailed diagram of an RFID base station that operates in accordance with one embodiment of the present invention is shown in FIG. 2. Specifically, the base station 100 includes a memory device 220 and a processor 210 connected to an RF transmitter 102 and an RF receiver 104 (collectively the communication circuit 230) via a digital-to-analog (D/A) converter 202 and an analog-to-digital (A/D) converter 204, respectively. When interrogating the RF transponder, digital signal data (e.g., in accordance with information stored in the memory device 220 and/or information provided by a host application (not shown)) is provided by the processor 210, converted into analog signal data by the D/A converter 202, and transmitted to the RF transponder via the transmitter 102 (or more particularly via the antenna connected to the transmitter (see FIG. 1)). Back-scattered data is then received by the receiver 104 (or more particularly the antenna connected to the receiver (see FIG. 1)), converted into digital data by the A/D converter 204, and provided to the processor 210 (e.g., to be further processed, stored in memory 220, provided to the host application (not shown), etc.).

It should be appreciated that the memory device depicted in FIG. 2 includes, but is not limited to, RAM, FRAM, cache memory, flash memory, EPROMs, EEPROMs, hard drives, removable drives, registers, combinatorial logic and all other types of data storage devices generally known to those skilled in the art. It should further be appreciated that the processor depicted in FIG. 2 includes, but is not limited to, application specific integrated circuits (ASICs), digital signal processors (DSPs), microprocessors, programmable devices, state machines and all other computing devices generally known to those skilled in the art. It should also be appreciated that the location, type, and/or number of components illustrated in FIG. 2 are merely provided to exemplify the environment in which the present invention may operate, and should not be considered limitations of the present invention. For example, an RFID base station including more than one memory device, having components in different locations (e.g., a D/A converter within the transmitter, a memory device external to the base station, etc.), or having additional (or fewer) components is considered to be within the spirit and scope of the present invention.

Figure 3:
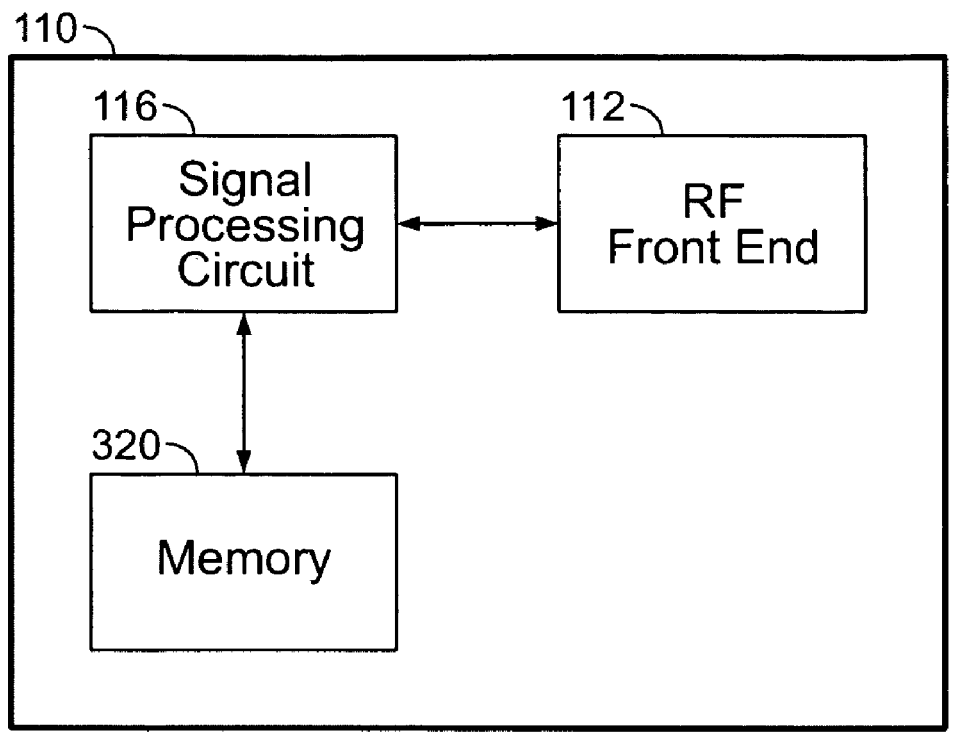
FIG. 3 illustrates an RF transponder that operates in accordance with one embodiment of the present invention.

A more detailed diagram of an RF transponder that operates in accordance with one embodiment of the present invention is shown in FIG. 3. Specifically, the RF transponder 110 includes a memory device 320 and a signal processing circuit 116 connected to an RF front end 112. When being interrogating by an RFID base station, RF signals are received by the RF front end 112 (or more particularly the antenna connected to the RF front end (see FIG. 1)) and decoded by the signal processing circuit 116. If the received RF signal is a read request and the ID number included in the read request matches the ID number stored in the memory device 320, then data stored in the memory device 320 (e.g., at an address included in the read request, in accordance with a particular read command, etc.) is modulated onto the back-scattered RF field. In other words, the ID number included in the read request is used to determine whether the read request is directed toward the RF transponder 110.

Alternatively, if the received RF signal is a write request and the ID number included in the write request matches the ID number stored in the memory device 320, then data included in the write request is stored in the memory device 320 (e.g., at an address included in the write request, in accordance with a particular write command, etc.). If, however, the RF signal (regardless of whether it is a read or write request) is a broadcast signal (i.e., directed toward multiple RF transponders), matching of the ID numbers may not be necessary.

It should be appreciated that the memory device depicted in FIG. 3 includes, but is not limited to, RAM, FRAM, cache memory, flash memory, EPROMs, EEPROMs, registers, combinatorial logic, and all other types of data storage devices generally known to those skilled in the art. It should further be appreciated that the signal processing circuit depicted in FIG. 3 includes, but is not limited to, application specific integrated circuits (ASICs), digital signal processors (DSPs), microprocessors, programmable devices, state machines and all other computing devices generally known to those skilled in the art. It should also be appreciated that the location, type, and/or number of components illustrated in FIG. 3 are merely provided to exemplify the environment in which the present invention may operate, and should not be considered limitations of the present invention. For example, an RFID base station including more than one memory device, having components in different locations (e.g., a signal processing circuit that includes a memory device, etc.), or having additional (or fewer) components is considered to be within the spirit and scope of the present invention.

Figure 4:
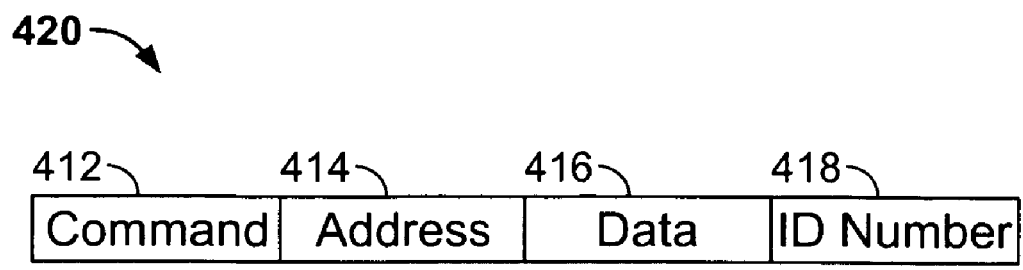
FIG. 4 illustrates an exemplary write request.

FIG. 4 illustrates an exemplary write request (or write data packet) that can be transmitted by an RFID base station and/or received by an RF transponder. Specifically, the write request 420 includes command (or opcode) information 412, address information 414, data 416, and an ID number 418, wherein the command information 412 identifies the type of the request (e.g., write request, etc.), the address information 414 identifies where (e.g., in the memory device) the data is to be stored, the data 416 is the information that is to be stored, and the ID number 418 identifies the RF transponder that the write request 420 is directed toward. It should be appreciated that the data structure shown in FIG. 4 is not a limitation of the present invention, and is merely provided to illustrate an exemplary write request that may be used in an RFID system.

Thus, write requests having fewer, more, or different components are considered to be within the spirit and scope of the present invention.

As previously discussed, the traditional method of effectuating communication between an RFID base station and an RF transponder, which includes the use of a single (lengthy) ID number and a comparison of that ID number before data can be stored in a memory device, is time consuming and therefore limits the number of RF transponders that can be communicated with during a given period of time. Therefore, in accordance with one embodiment of the present invention, at least a first and second ID number are stored on the RF transponder (e.g., in its memory device, etc.) and at least the second ID number is used to effectuate communication between an RFID base station and an RF transponder. Furthermore, in accordance with another embodiment of the present invention, data included in the write request is stored in a memory device on the RF transponder before the ID number included in the write request is compared to the ID number stored in the memory device.

In a first embodiment of the present invention, referring back to FIG. 3, both a first ID number and a second ID number are stored in the memory device 320, wherein the first ID number is a unique (or substantially unique) identifier of the RF transponder 110 (or an object attached thereto) and the second ID number is smaller than the first ID number and can be used to distinguish the RF transponder 110 from at least one other RF transponder. Generally speaking, the first ID number (or full ID number) (which there may be more than one, or it may be a string of ID numbers) is a relatively lengthy and preferably unique (or substantially unique) ID number that can be used to identify (fairly certainly) the RF transponder or an object related (or attached) thereto. It should be appreciated that while the second ID number is generally smaller than the first ID number (hence the term compact ID number), it may be advantageous (in certain circumstances) for the second ID number to be larger than the first ID number (e.g., for security purposes, etc.).

In accordance with this embodiment, an RFID base station is adapted to communicate with the RF transponder 110 by requesting its second ID number (e.g., via a read request, an ID read request, a compact ID read request, etc.) and using the second ID number (as opposed to the first ID number) to construct a write request. In other words, with reference to FIG. 4, the ID number portion 418 of the write request 420 would be the second ID number. Upon receipt of such a write request 420, the RF transponder 110 is adapted to compare the ID number 418 with the second ID number stored in the memory device 320. If the numbers match, the data 416 is stored in the memory device 320 (e.g., at the address 414, etc.). If the ID numbers do not match, the write request is ignored. It should be appreciated that the present invention is not limited to an RF transponder that transmits its ID number (e.g., second ID number, etc.) upon receiving a request to do so, but also includes RF transponders that broadcast their ID number independent of such a request. It should further be appreciated that the second ID number referred to herein could be stored in the memory device at the time the RF transponder is fabricated (e.g., at the factory), assigned by an RFID base station, or determined (at least once) by the RF transponder (e.g., circuitry located therein, etc.).

In a second embodiment of the present invention the RF transponder is adapted to determine the second ID number using at least a portion of the first ID number. For example, the second ID number could be a subset of the first ID number (e.g., its first eight bits, etc.). As another example, the second ID number could be determined using an algorithm that is based on at least a portion of the first ID number. For example, a random-number-generator algorithm could be used, wherein the "seed" for the algorithm (i.e., a number used by the algorithm to determine a random number) is at least a portion of the first ID number. It should be appreciated that in this example, a different portion of the first ID number could be used (e.g., as a "seed") to determine a different random number (e.g., if two transponders have the same second ID number, etc.). Such an operation, for example, could be performed in response to a "renew ID number" command, or whenever such an operation is appropriate.

In a third embodiment of the present invention, the second ID number is independent of the first ID number. For example, the second ID number could be a constant that is stored either when the RF transponder is being manufactured, attached to an object, or any time thereafter. In one embodiment of the present invention, the RF transponder includes multiple second ID numbers, each one being stored in a different memory location. Such an embodiment would allow the RF transponder to use a different ID number when to do so would be advantageous (e.g., conflicting ID numbers, etc.).

In a fourth embodiment of the present invention, the data portion of the write request is stored before the ID number portion of the write request is compared to the ID number stored in the memory device (e.g., first ID number, second ID number, etc.). Specifically, as shown in FIG. 4, the first portion of the write request is generally a command portion 412, or a portion that identifies the type of request that is being made. Thus, for example, prior to receiving the entire write request 420, the RF transponder may already know that the write request is being received. The RF transponder would then receive, according to FIG. 4, an address 414 as to where the data is to be stored, the data 416 that is to be stored, and an ID number 418, in that order. Such a write request structure (e.g., receiving data before the ID number) enables the RF transponder to store (or at least begin storing) the data included in the write request before the entire ID number in the write request is received and/or compared with the ID number stored in the memory device. If the ID number included in the write request matches the ID number in the memory device, then the stored data is left undisturbed. If, however, the ID numbers do not match, then the stored data is erased.

The stored data can be erased by either replacing the data with a null set (e.g., all zeros or ones) or replacing the data with data previously stored in that location. For example, upon receipt of a write request, the RF transponder could (i) identify the memory location included in the write request, (ii) move the data stored in that memory location (i.e., the original data) to an alternate location (e.g., a register, etc.), (iii) store the data included in the write request in the identified memory location, and (iv) compare the ID numbers. If the ID numbers do not match, the original data could then be moved back to its original location or the identified memory location, thereby erasing the data stored pursuant to the write request. It should be appreciated that the RF transponder may further be adapted to perform additional functions after the ID numbers are compared (e.g., back-scatter a signal indicating whether a match was made, etc.). It should also be appreciated that this type of operation (i.e., storing data prior to comparing ID numbers) may be prohibited if the location identified in the write request is prohibited or write protected.

Figure 5:
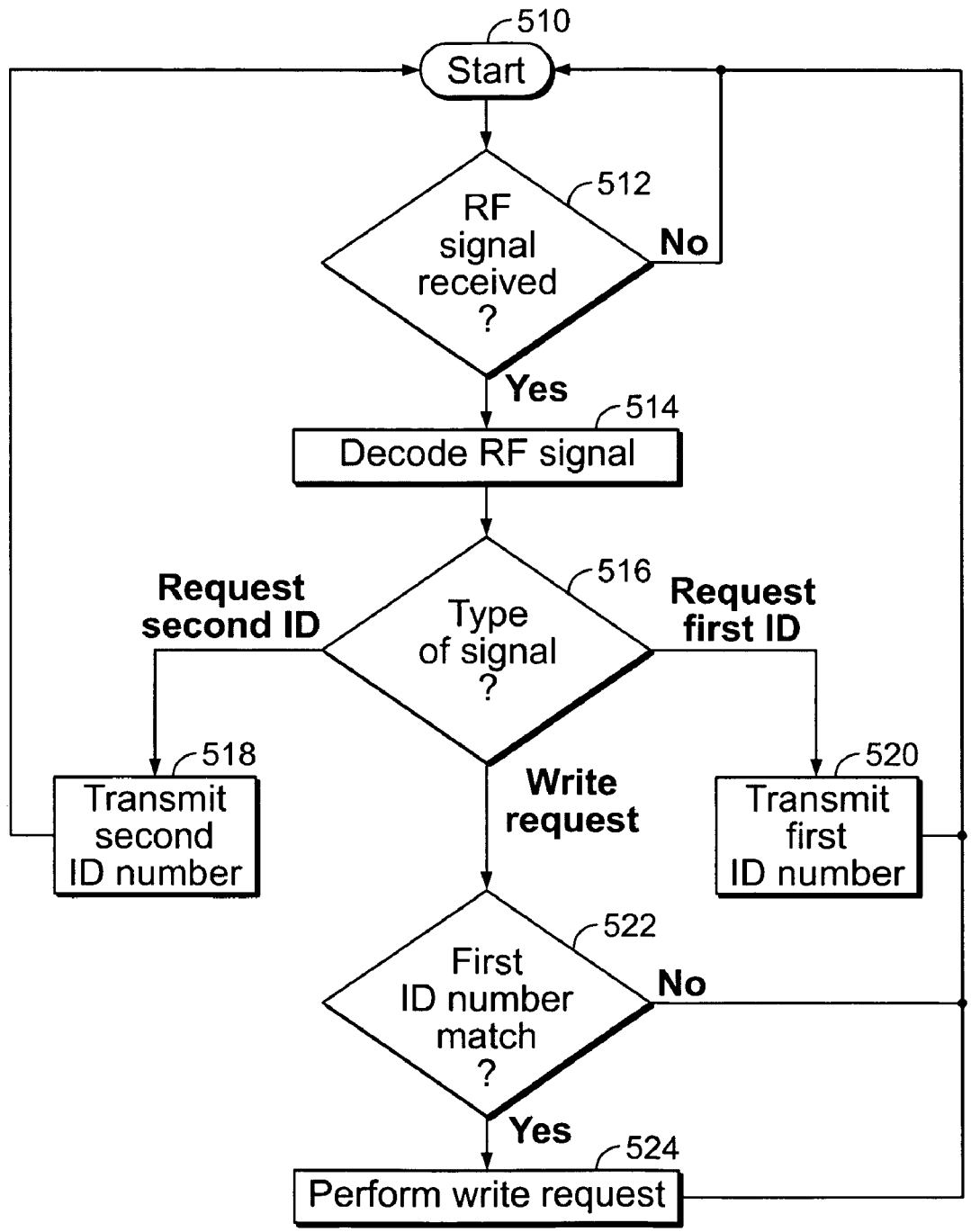
FIG. 5 illustrates a method of communicating with an RFID base station in accordance with one embodiment of the present invention.

A method of communicating with an RFID base station in accordance with one embodiment of the present invention is illustrated in FIG. 5. Specifically, the method is started at step 510, and a determination is made as to whether an RF signal is received at step 512. If the result is NO, the process begins again at step 510. If, however, the result is YES, the received RF signal is decoded at step 514. At step 516, a determination is made as to the type of RF signal received. If the RF signal is a request for a second ID number, then the second ID number (e.g., as stored in memory) is transmitted to the RFID base station at step 518. This is done, for example, by imparting the ID number onto the back-scattered RF field. If the RF signal is a request for a first ID number, then the first ID number (e.g., as stored in memory) is transmitted to the RFID base station at step 520. If the RF signal is a write request, then the ID number portion of the write request is compared to the second ID number stored in memory at step 522. If the ID numbers do not match, then the process begins again at step 510. If, however, the ID number do match, then the data included in the write request is stored in memory (e.g., at the address included in the write request, etc.) at step 524. The process then begins again at step 510.

It should be appreciated that the flow chart illustrated in FIG. 5 is not intended to limit the present invention, but is merely provided to illustrate one exemplary method as to how the present invention may operate. Thus, for example, a method that includes different steps (e.g., identifying different signal types at step 516, etc.), fewer steps (e.g., eliminating step 522 for broadcasted requests, eliminating steps 518 and 520 for transponders that broadcast their ID number, etc.), or additional steps (e.g., notifying the RFID base station if the ID numbers do not match at step 522, etc.) is considered to be within the spirit and scope of the present invention.

Figure 6:
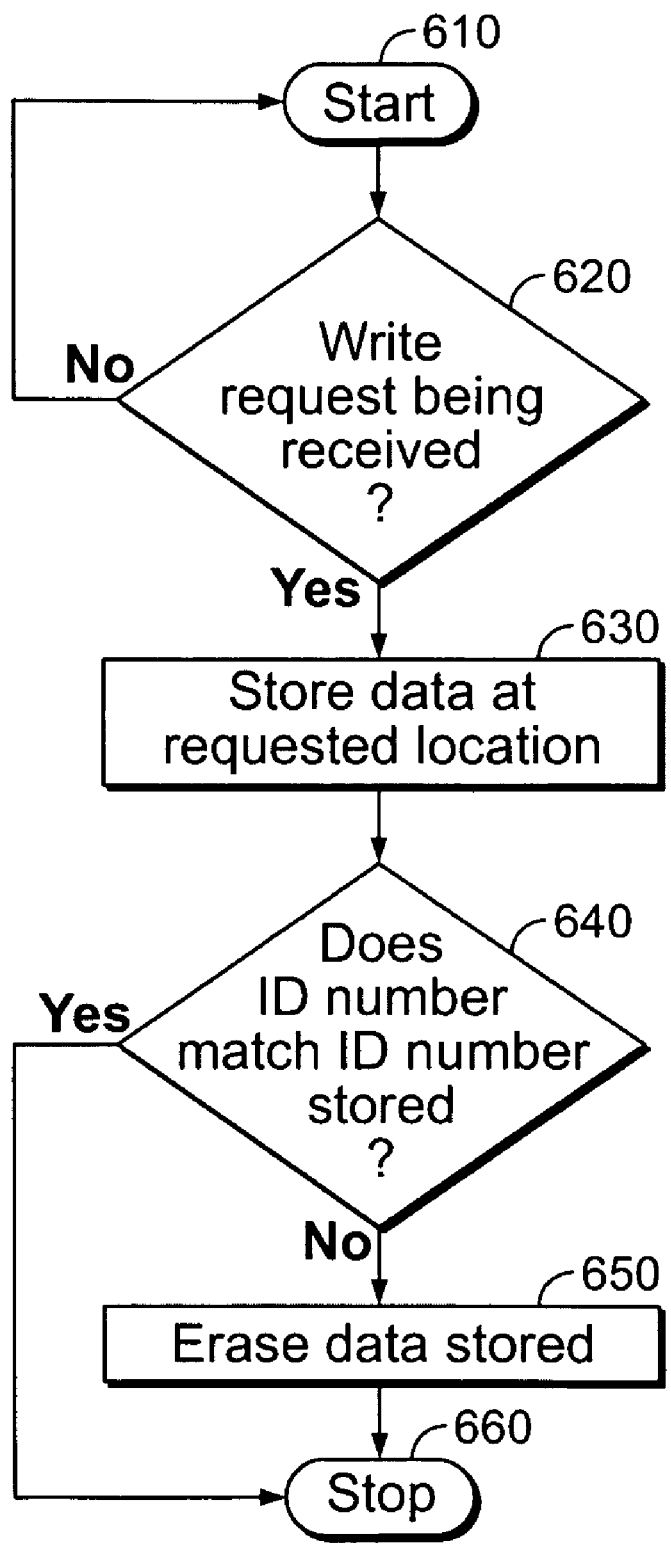
FIG. 6 illustrates a method of storing data in a memory on an RF transponder in accordance with one embodiment of the present invention.

A method of storing data on an RF transponder in accordance with one embodiment of the present invention is illustrated in FIG. 6. Specifically, the method is started at step 610, and a determination is made as to whether a write request is being received at step 620. If the result is NO, the process begins again at step 610. If, however, the result is YES, the data included in the write request is then received and stored in memory at step 630 (e.g., at an address included in the write request, etc.). After an ID number portion of the write request is received, the ID number is then compared with an ID number stored in memory (e.g., first ID number, second ID number, etc.) at step 640. If the ID numbers match, then the process ends at step 660. If the ID numbers do not match, then the stored data is erased (e.g., replaced with a null set, the original data, etc.) at step 650, and the process ends at step 660.

Having thus described several embodiments of a system and method of using at least one identification number to effectuate communication between an RF transponder and an RFID base station, it should be apparent to those skilled in the art that certain advantages of the within described system and method have been achieved. It should also be appreciated that various modifications, adaptations, and alternative embodiments thereof may be made within the scope and spirit of the present invention. The invention is further defined by the following claims.

What is claimed is:

1. A radio frequency (RF) transponder comprising:
   a front end circuit adapted to receive and transmit RF signals;
   an antenna electrically connected to said front end circuit;
   a memory device for storing at least one identification (ID) number; and
   a signal processing circuit electrically connected to said front end and said memory device, said signal processing circuit being adapted to:
      recognize an incoming RF signal as a write request, said write request including at least data, an address, and a transponder identifier;

store said data at said address in said memory; and compare said transponder identifier with at least a portion of said at least one ID number and erase said data from said memory prior to the recognition of a subsequent write request if said transponder identifier does not match said at least a portion of said at least one ID number.

2. The RF transponder of claim 1, wherein said signal processing circuit is further adapted to store a portion of said data at substantially the same time as said portion is received by said signal processing circuit.

3. The RF transponder of claim 1, wherein said signal processing circuit is further adapted to store at least a portion of said data before the entire portion of said transponder identifier is received by said signal processing circuit.

4. The RF transponder of claim 1, wherein said memory device further stores a first ID number and a second ID number and said signal processing circuit is further adapted to compare said transponder identifier with said first ID number and erase said data from said memory if said transponder identifier does not match said first ID number.

5. The RF transponder of claim 1, wherein said memory device further stores a first ID number and a second ID number and said signal processing circuit is further adapted to compare said transponder identifier with said second ID number and erase said data from said memory if said transponder identifier does not match said second ID number.

6. The RF transponder of claim 5, wherein said second ID number is based on said first ID number.

7. The RF transponder of claim 5, wherein said second ID number is a subset of said first ID number.

8. The RF transponder of claim 5, wherein said second ID number is a product of a random-number-generator algorithm that uses at least a portion of said first ID number as a seed.

9. The RF transponder of claim 5, wherein said first ID number is a unique identifier of said RF transponder and said second ID number is smaller than said first ID number and usable to distinguish said RF transponder from at least one other RF transponder.

10. A radio frequency (RF) transponder comprising:
   a front end circuit adapted to receive and transmit RF signals;
   an antenna electrically connected to said front end circuit;
   a memory device for storing at least one identification (ID) number; and
   a signal processing circuit electrically connected to said front end and said memory device, said signal processing circuit being adapted to:
      recognize an incoming RF signal as a write request, said write request including at least data, a memory device address wherein said data is to be stored, and a transponder identifier
      store said data at said memory device address in said memory prior to matching of said transponder identifier with at least a portion of said at least one ID number; and
      compare said transponder identifier with at least a portion of said at least one ID number and erase said data from said memory if said transponder identifier does not match said at least a portion of said at least one ID number.

11. The RF transponder of claim 10, wherein said signal processing circuit is further adapted to store a portion of said data at substantially the same time as said portion is received by said signal processing circuit.

12. The RF transponder of claim 10, wherein said signal processing circuit is further adapted to store at least a portion of said data before the entire portion of said transponder identifier is received by said signal processing circuit.

13. The RF transponder of claim 10, wherein said memory device further stores a first ID number and a second ID number and said signal processing circuit is further adapted to compare said transponder identifier with said first ID number and erase said data from said memory if said transponder identifier does not match said first ID number.

14. The RF transponder of claim 10, wherein said memory device further stores a first ID number and a second ID number and said signal processing circuit is further adapted to compare said transponder identifier with said second ID number and erase said data from said memory if said transponder identifier does not match said second ID number.

15. The RF transponder of claim 14, wherein said second ID number is based on said first ID number.

16. The RF transponder of claim 14, wherein said second ID number is a subset of said first ID number.

17. The RF transponder of claim 14, wherein said second ID number is a product of a random-number-generator algorithm that uses at least a portion of said first ID number as a seed.

18. The RF transponder of claim 14, wherein said first ID number is a unique identifier of said RF transponder and said second ID number is smaller than said first ID number and usable to distinguish said RF transponder from at least one other RF transponder.

* * * * *